(12) United States Patent
Koizumi (10) Patent No.: US 6,266,066 B1
(45) Date of Patent: Jul. 24, 2001

(54) SHADOWBOX INPUT OF ILLUMINATION INFORMATION

(75) Inventor: David H. Koizumi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/206,127

(22) Filed: Dec. 4, 1998

(51) Int. Cl.$^7$ .................................................. G06T 15/50
(52) U.S. Cl. ............................................................ 345/426
(58) Field of Search .................................... 345/426, 207, 345/147, 156, 81

(56) References Cited

U.S. PATENT DOCUMENTS

| | | | |
|---|---|---|---|
| 4,386,345 | * 5/1983 | Narveson et al. | 340/703 |
| 5,270,818 | * 12/1993 | Ottenstein | 358/161 |
| 5,500,530 | * 3/1996 | Gregoris | 250/339.11 |
| 5,734,439 | * 3/1998 | Wirbitzke et al. | 348/602 |
| 5,952,992 | * 9/1999 | Helms | 345/102 |

* cited by examiner

*Primary Examiner*—Mark Zimmerman
*Assistant Examiner*—Euvique L. Sautiago
(74) *Attorney, Agent, or Firm*—Schwegman, Lundberg, Woessner & Kluth, P.A.

(57) ABSTRACT

Methods and apparatus adapted for using video input devices to capture illumination information for input to computer graphics applications. The methods include obtaining information from an illuminated region, wherein the illuminated region is generated by passing light from an illumination source through an aperture and impinging that light on a surface; determining a quality of the illumination source derived from the information; and generating an output for use in a computer application, wherein the output is indicative of the quality of the illumination source. The apparatus include an opaque plate having an aperture and second plate adjacent the opaque plate, wherein light from an illumination source passing through the aperture impinges on the second plate, thereby producing an illuminated region on the second plate. Machine-readable medium and systems adapted to utilize the methods and apparatus are included.

26 Claims, 6 Drawing Sheets

SHADOWBOX INPUT OF ILLUMINATION INFORMATION

SUMMARY OF THE INVENTION

The invention relates generally to gathering and interpreting illumination information for input to computer graphics applications. One embodiment of the invention provides a method. The method includes obtaining information from an illuminated region, wherein the illuminated region is generated by passing light from an illumination source through an aperture and impinging that light on a surface; determining a quality of the illumination source derived from the information; and generating an output for use in a computer application, wherein the output is indicative of a quality of the illumination source.

Another embodiment of the invention provides an input system. The input system includes an opaque plate having an aperture, a video input device and a frosted plate interposed between the video input device and the opaque plate. In this embodiment, light from an illumination source passing through the aperture impinges on the frosted plate, thereby producing an illuminated region on the frosted plate. The illuminated region on the frosted plate is indicative of at least one quality of the illumination source, and is visible to the video input device through the frosted plate. Other embodiments of the invention include methods, apparatus, systems and machine-readable medium of varying scope.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is, therefore, not to be taken in a limiting sense, and the scope of the invention is defined by the appended claims. Like numbers in the figures refer to like components, which should be apparent from the context of use.

The detailed description is written in the context of a box-like enclosure having a circular aperture on the top of the enclosure. The shape of the enclosure, and shape and orientation of the aperture are chosen for convenience and in no way limit the scope of the invention. From the following discussion, it will be readily apparent to those skilled in the art that the shape of the enclosure is not critical and that changes can be made at the whim of the designer, e.g., cylindrical, spherical or other three-dimensional shape. Furthermore, the orientation of the aperture may be in any relationship to the illumination source provided that light passing through the aperture impinges on a relevant surface within the enclosure, i.e., one capable of providing information on the illuminated region. In addition, while changing the shape of the aperture requires readily apparent modifications to the illustrated methods, the fundamental approach to obtaining illumination information remains unchanged.

Figure 1:
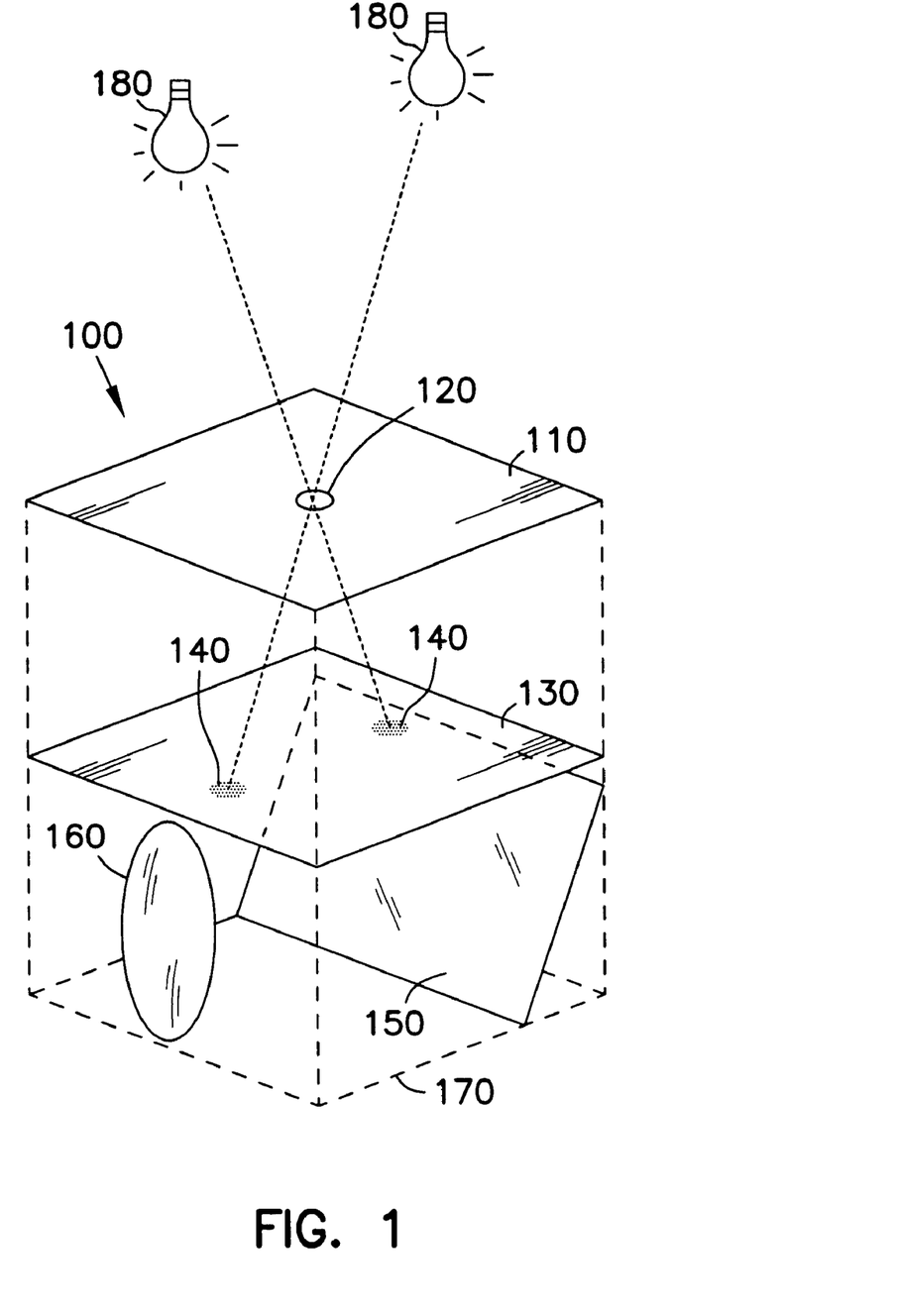
FIG. 1 is one embodiment of an apparatus for obtaining information from an illumination source.

FIG. 1 depicts one embodiment of an apparatus for input of illumination information. The term "shadowbox" is used hereafter to describe the apparatus. Shadowbox 100 includes an opaque plate 110 with an aperture 120. Shadow box 100 further contains a second plate, or screen 130. In addition, shadowbox 100 is shown with a mirror 150 and a compensating lens 160. Shadowbox 100 is shown as having an enclosure 170 (in dashed lines). Enclosure 170 should be opaque, or otherwise block most ambient light, to improve resolution of illuminated regions 140 produced on screen 130 from light passing through aperture 120.

Opaque plate 110 and screen 130 are depicted as generally planar plates in a generally parallel spaced-apart relationship. There is no requirement that the plates be either planar or in a parallel relationship. As will be clear to the reader upon studying this detailed description, the minimum requirements of shadowbox 100 are that light pass through an opening and impinge on a surface. The geometry merely affects the calculations necessary to obtain the illumination information, and such calculations are readily determinable by one skilled in the art based on the known geometry.

Aperture 120 may be a hole or void in opaque plate 110, or an otherwise transparent portion of opaque plate 110 such that light from illumination sources 180 may pass through. Aperture 120 is shown having a circular shape. As with the geometry of plate 110 and screen 130, the shape of aperture 120 is not critical and merely affects the calculations.

Shadowbox 100 is shown in use with two illumination sources 180 in FIG. 1. Two illumination sources 180 will produce two illuminated regions 140 as light passes through aperture 120 and impinges on screen 130. In general, one illuminated region 140 will be produced on screen 130 for each illumination source 180 directed at shadowbox 100.

In shadowbox 100 as shown, screen 130 is a lambertian, or frosted, plate. Light impinging on screen 130 and producing an illuminated region 140 will be visible to mirror 150. Mirror 150 redirects the image of the underside of screen 130 with illuminated regions 140 to compensating lens 160. Compensating lens 160 focuses the image of screen 130 within a depth of field of a video camera (not shown) to adapt the image for better viewing.

Figure 3:
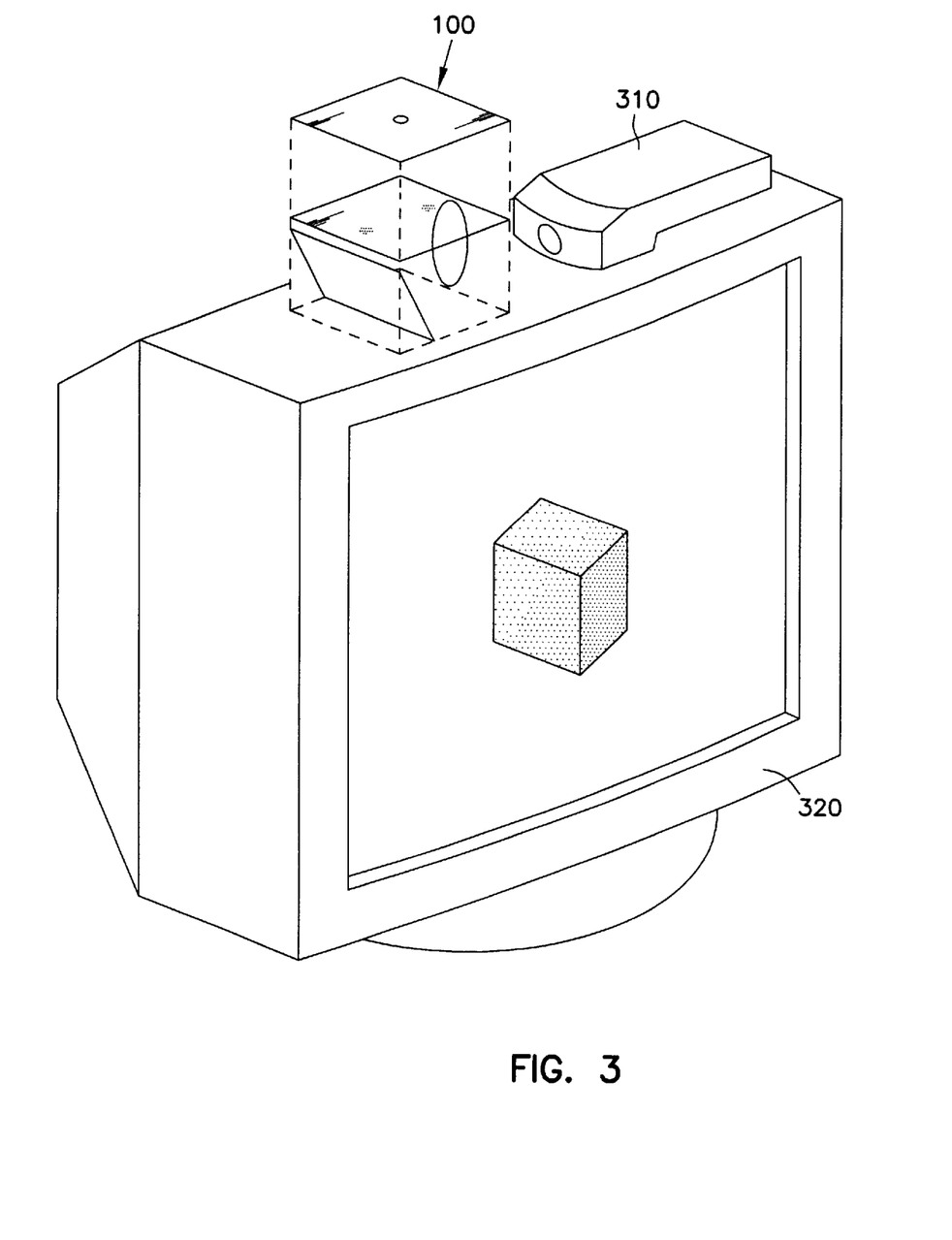
FIG. 3 is a system for obtaining illumination information from an illumination source in accordance with one embodiment of the invention.
Figure 4:
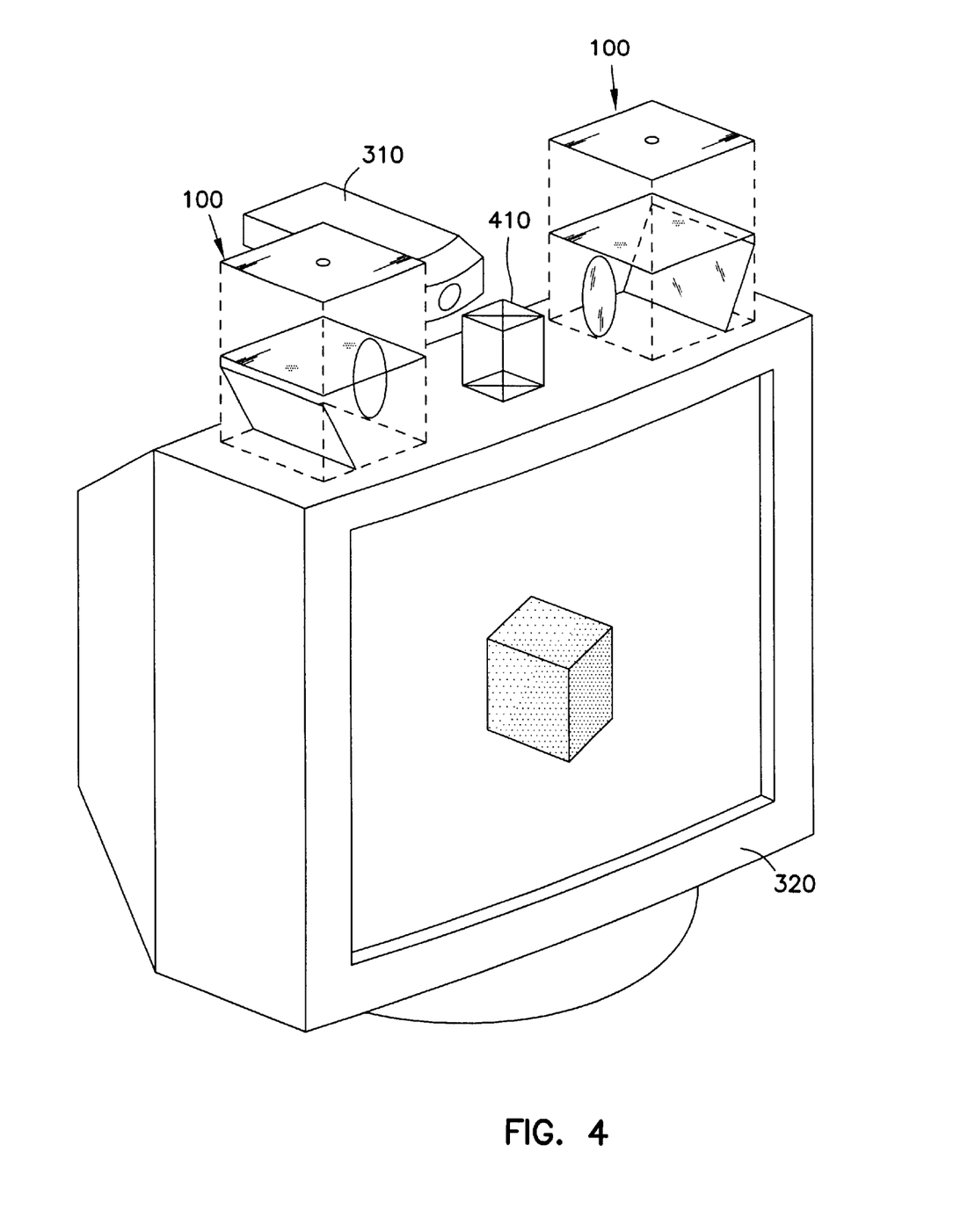
FIG. 4 is a system for obtaining illumination information from an illumination source in accordance with another embodiment of the invention.
Figure 5:
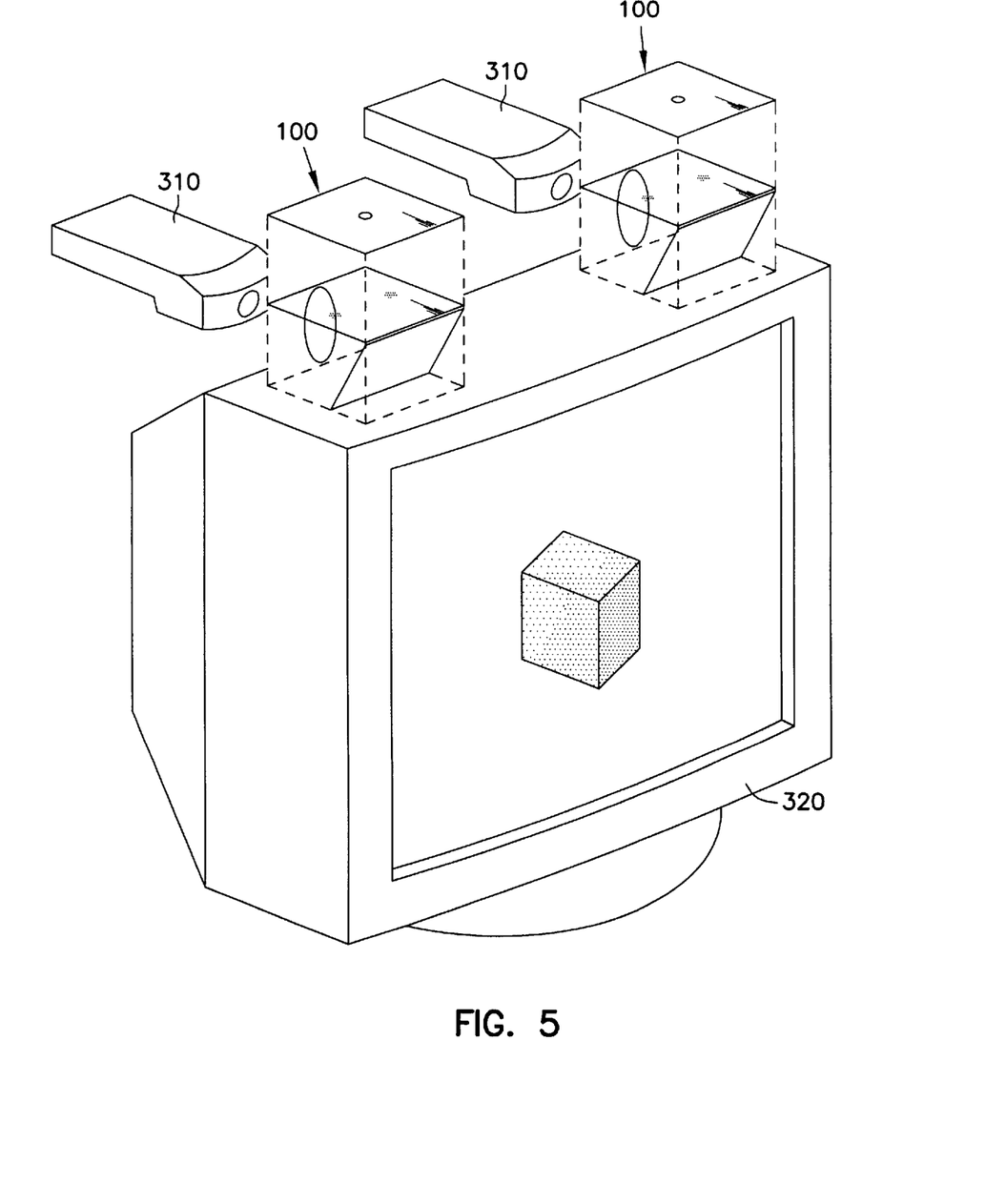
FIG. 5 is a system for obtaining illumination information from an illumination source in accordance with a further embodiment of the invention.

Mirror 150 is not required in shadowbox 100, but is only used to allow more convenient placement of the video camera, as detailed in conjunction with FIGS. 3–5. The image on screen 130 could be viewed directly without the use of a mirror 150. Furthermore, compensating lens 160 is utilized to reduce the need for manipulation of the image obtained by video cameras of the type most commonly available. Given the digital nature of the video image, compensating lens 160 may be replaced by image processing software. Furthermore, a video camera with an appropriate focal point could be used with shadowbox 100 without the need for compensating lens 160.

Figure 2:
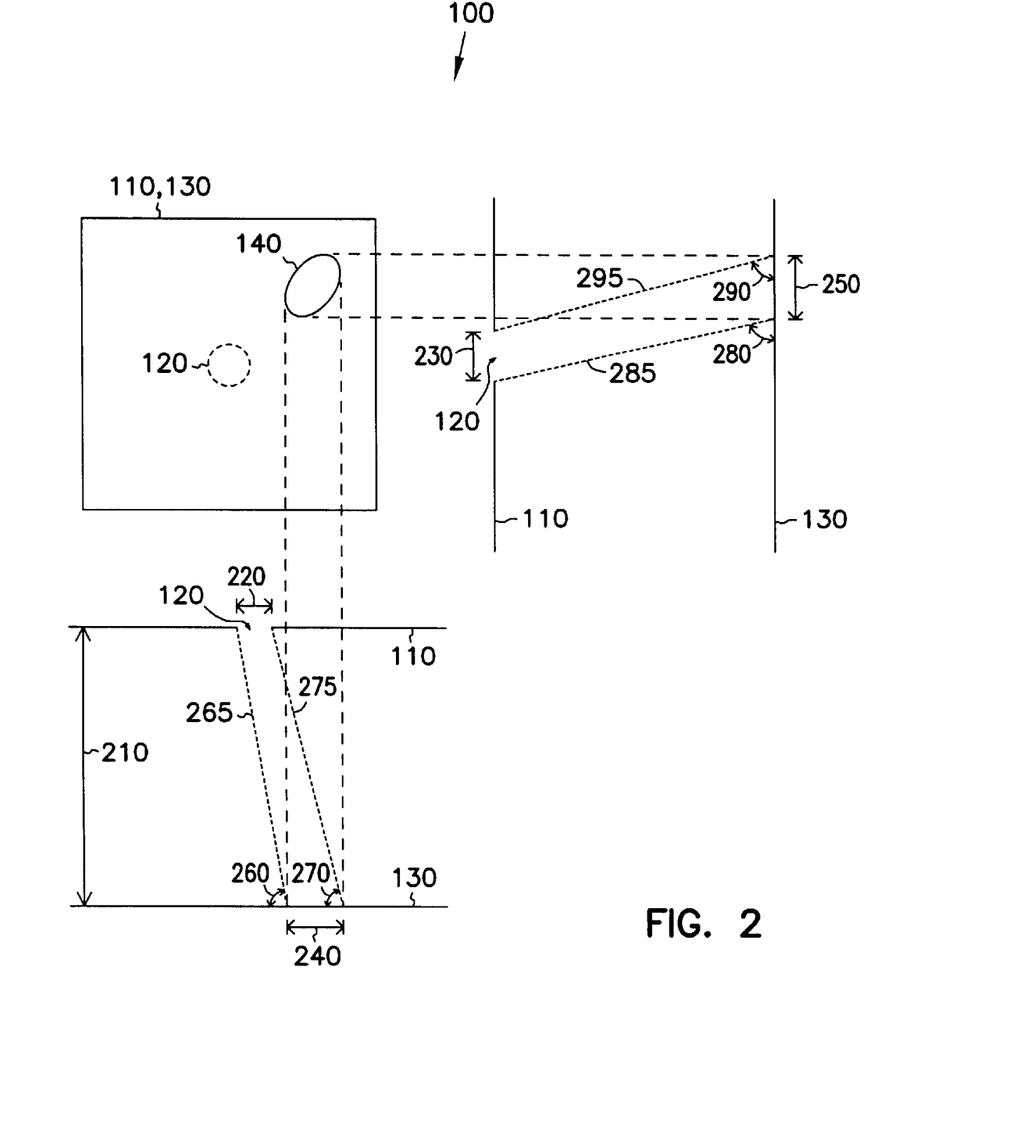
FIG. 2 is a plan and sectional view of the apparatus of FIG. 1.

FIG. 2 allows a more detailed description of the interaction of light from an illumination source, aperture 120 and an illuminated region 140. For ease of discussion, use of only one illumination source will be detailed. It will be readily apparent that the description may be extrapolated to the case of additional illumination sources. Furthermore, the sectional views depicted in FIG. 2 are generally at right angles, although this choice is merely a matter of convenience.

As shown in FIG. 2, aperture 120 has a width 220 and a length 230. In the special case of a circular aperture, width 220 and length 230 are equal. Light entering shadowbox 100 through aperture 120 impinges on screen 130 to produce illuminated region 140. Illuminated region has a width 240 and a length 250. As illuminated region 140 will generally have an elongated form if the illumination source is not perpendicular to aperture 120, width 240 may not equal length 250.

In the geometrical optic limits, light entering aperture 120 will be bounded by rays 265 and 275, and 285 and 295, as shown in the sectional views. These rays 265, 275, 285 and 295 impinge screen 130 at angles 260, 270, 280 and 290, respectively. Upon determining a perpendicular extending from screen 130 to the intersection of ray 265 and opaque plate 110, angle 260 may be determined using the linear displacement of ray 265 along screen 130 from such a perpendicular and the known spacing 210 between opaque plate 110 and screen 130 using an arctangent. Accordingly, angle 260 equals the arctangent of spacing 210 divided by the linear displacement of ray 265 from such a perpendicular. Angles 270, 280 and 290 are determined in like fashion.

The angle of incidence of the illumination source can be estimated by taking a first average of angles 260 and 270 and a second average of angles 280 and 290. The angle of the first average establishes a first plane of incidence while the angle of the second average establishes a second plane of incidence. The intersection of these two planes establishes a line which provides the angle of incidence in three-dimensional space.

In addition to determining the angle of incidence, it is possible to estimate the absolute position of the illumination source. Using simple geometry, angles 260 and 270 provide sufficient information to determine a position of the illumination source along a first line. Each angle will provide sufficient information to determine a position of the illumination source within a plane, while the intersection of the two planes produces the first line. Similarly, angles 280 and 290 provide sufficient information to determine a position of the illumination source along a second line established in like fashion. The intersection of the first and second lines establishes the absolute position of the illumination source. It should be noted that the foregoing presumes theoretical accuracy and point-source illumination. In practice, due to accuracy or other errors in measurement and lack of theoretical point sources, the first and second lines may not intersect. In this case, the position of the illumination source can be estimated to be somewhere on a connecting line between the first and second lines, the connecting line being a line drawn between the point on the first line closest to the second line and the point on the second line closest to the first line. A further refinement to this approximation would be to take the midpoint of the connecting line as the location of the illumination source.

Intensity of the illumination source can be determined indirectly from measurements of the intensity of the illuminated region and a calculated distance to the illumination source. Furthermore, use of a color-capable video input device allows measurement of color characteristics of the illumination source. Other qualities of the illumination source are quantifiable using methods well known in the art.

FIG. 3 shows one example of a system utilizing a shadowbox 100 for input of illumination information. As shown, a video input device, or camera 310, is placed in view of the compensating lens of shadowbox 100 such that camera 310 is capable of obtaining digitized images of the illuminated regions.

In determining qualities of the illumination sources as described above, measurements were referenced to screen 130. It should be apparent that any measurement obtainable from screen 130 can be indirectly measured from a digitized image. Given a known geometry of shadowbox 100, the qualities of the illumination sources can be calculated from the digitized image of screen 130 based on the characteristics of the illuminated regions, such as size, shape, position, color and intensity. The qualities of the illumination sources can thus be adapted for input to computer applications utilizing virtual illumination sources. These illumination qualities can be input to the computer application automatically, or they can be displayed for manual entry by a user. In either case, an application utilizing virtual illumination sources can use the illumination quality input to generate and display a graphic on display 320 with highlighting and shadowing to create an illusion that the physical illumination source is lighting the graphic.

Furthermore, the illumination information may be static, i.e., a snap-shot of the illumination source at one point in time, or it may be dynamic such that the computer application responds to changes in the illumination source over time. Dynamic input of illumination information allows a user to move one or more illumination sources around shadowbox 100 to produce a desired effect in the computer application. Such physical manipulation of an illumination source is expected to be a more intuitive approach to producing changes in the application rather than manipulating abstract settings for a virtual illumination source, thus making use of such graphics applications easier to grasp and exploit.

FIG. 4 shows another embodiment of an input system. This embodiment utilizes two shadowboxes 100 with one camera 310. To combine the images from both shadowboxes 100 to one camera 310, an image redirect 410 is added. Image redirect 410 may be a pair of mirrored surfaces redirecting each image to a portion of the field of view of camera 310. The resulting image captured by camera 310 would have a split screen effect, with the image from the first shadowbox 100 on one side and the image from the second shadowbox 100 on the other side.

By providing two shadowboxes 100, more accurate real-time triangulation of the illumination sources is possible. This increase in accuracy results from the additional data available from analyzing two illumination regions for each illumination source. To achieve this increase in accuracy, the spacing between the aperture on the first shadowbox 100 and the aperture on the second shadowbox 100 should be known with some degree of precision. Higher degrees of precision result in higher accuracy of triangulation. For convenience, the two shadowboxes 100 could be combined into a single unit having two apertures in one opaque plate, such that the spacing between the apertures is fixed. Such a combined unit could also utilize one frosted plate.

FIG. 5 shows an alternative to combining the image from two shadowboxes. FIG. 5 depicts two shadowboxes 100, with one camera 310 capturing an image for each shadowbox 100. Again, for accuracy in triangulation, the spacing between the apertures of the two shadowboxes 100 should be known with some degree of precision. As with the embodiment of FIG. 4, the two shadowboxes 100 could be combined into a single unit having two apertures, such that the spacing between the apertures is fixed.

Figure 6:
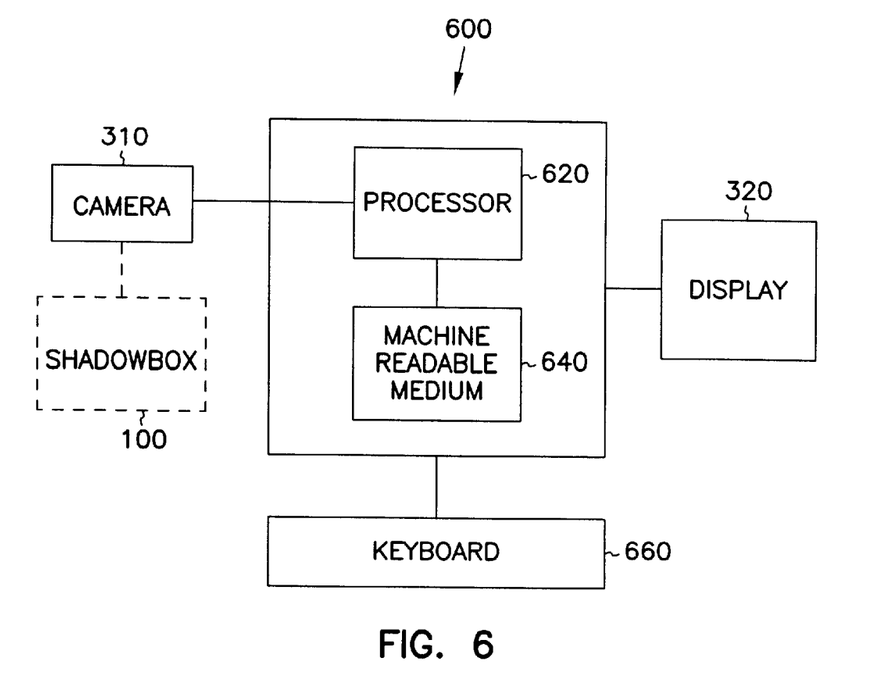
FIG. 6 is a block diagram of a computer system incorporating an aspect of the invention.

Information obtained from a shadowbox as described above may be gathered and acted upon by a computer system. FIG. 6 shows one embodiment of a computer system 600 having a computer 610, a camera 310 and a display 320. Computer 610 has a processor 620 and a machine-readable medium 640. Processor 620 is adapted to accept input signals from camera 310, manipulate or act upon that input, and generate output signals to display 320. Output to display 320 may be text or graphic output. Computer 610 may further have a manual user input device such as keyboard 660 for entry of information to processor 620 by a computer user. Other user input devices and their operation are well known in the art.

Machine-readable medium 640 has instructions stored thereon for causing processor 620 to carry out the methods described above for using a video input device to capture illumination information used to quantify illumination source qualities for input to computer graphics applications. Machine-readable medium 640 may further store information obtained from camera 310, or information generated by processor 620 in response to information obtained from camera 310. Machine-readable medium 640 may be a physically fixed medium within computer 610, such as a fixed disk drive, flash memory, programmable read-only memory, random-access memory or other fixed storage medium known in the art. Machine-readable medium 640 further may be removable from computer 610, such as a floppy disk, CD-ROM, tape cartridge, or other removable storage medium known in the art.

Figure 7:
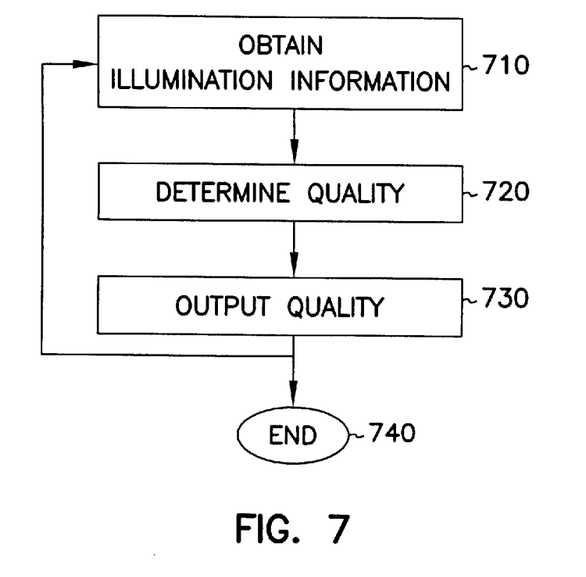
FIG. 7 is a flowchart of one method of the invention.

FIG. 7 is a flowchart of one method in accordance with the invention. In box 710, illumination information is obtained from a video input device using a shadowbox. The information obtained has at least one datum selected from the group comprising size, shape, position, color and intensity of an illuminated region. That illumination information is acted upon to determine, or quantify, the qualities of the illumination source in box 720. Those qualities include location, angle of incidence, color or intensity. At box 730, the quantified qualities of the illumination source are output. The output may be to a machine-readable medium for direct use by a computer graphics application, or it may be to a display in text or graphic format for viewing by a computer user and subsequent input to a computer graphics application using a manual input device. For dynamic generation of illumination quality information, control is passed from box 730 back to box 710 to repeat the process. For static generation of illumination quality information, control is passed from box 730 to end box 740. It is well within the ordinary skill in the art to prepare program code for causing a processor to carry out the methods previously described, and to store that program code on a machine-readable medium for use by the processor.

Apparatus and methods for obtaining illumination quality information for use in computer graphics applications have been described. Methods include obtaining information from an illuminated region, wherein the illuminated region is generated by passing light from an illumination source through an aperture and impinging that light on a surface; determining a quality of the illumination source derived from the information; and generating an output for use in a computer application, wherein the output is indicative of a quality of the illumination source.

Apparatus include an opaque plate having an aperture, a video input device and a frosted plate interposed between the video input device and the opaque plate. In such apparatus, light from an illumination source passing through the aperture impinges on the frosted plate, thereby producing an illuminated region on the frosted plate. The illuminated region on the frosted plate is indicative of at least one quality of the illumination source, and is visible to the video input device through the frosted plate.

The apparatus and methods of the invention allow a user to physically manipulate illumination sources to produce a response in a computer graphic, providing the capability to simulate highlighting and shadowing as if the physical illumination sources were directly illuminating the computer graphic. Such physical manipulation of an illumination source is expected to be a more intuitive, and thus easier, approach to producing changes in computer graphics applications rather than manipulating abstract settings for a virtual illumination source.

Although specific embodiments have been illustrated and described herein, it will be appreciated by those of ordinary skill in the art that any arrangement which is calculated to achieve the same purpose may be substituted for the specific embodiments shown. Many adaptations of the invention will be apparent to those of ordinary skill in the art. Accordingly, this application is intended to cover any adaptations or variations of the invention. It is manifestly intended that this invention be limited only by the following claims and equivalents thereof.

What is claimed is:

1. A method of providing illumination source quality input for a computer application, the method comprising:

obtaining information from an illuminated region, wherein the illuminated region is generated by passing light from an illumination source through an aperture and impinging that light on a surface;

determining a quality of the illumination source derived from the information; and generating an output for use in the computer application, wherein the output is indicative of the quality of the illumination source.

2. A machine-readable medium having instructions stored thereon capable of causing a processor to carry out the method of:

obtaining information from an illuminated region, wherein the illuminated region is generated by passing light from an illumination source through an aperture and impinging that light on a surface;

determining a quality of the illumination source derived from the information; and generating an output for use in the computer application, wherein the output is indicative of the quality of the illumination source.

3. A method of providing illumination source quality input for a computer application, the method comprising:

obtaining information from an illuminated region, wherein the illuminated region is generated by passing light from an illumination source through an aperture and impinging that light on a surface, further wherein obtaining information from the illuminated region comprises obtaining a digitized image of the illuminated region;

determining a quality of the illumination source derived from the information; and generating an output for use in the computer application, wherein the output is indicative of the quality of the illumination source.

4. The method of claim 3, wherein the information obtained is at least one datum selected from the group comprising size, shape, position, color and intensity.

5. The method of claim 3, wherein the quality is selected from the group comprising location, angle of incidence, color and intensity.

6. The method of claim 3, wherein the output is in a form selected from the group comprising textual, graphical and machine readable.

7. The method of claim 3, wherein impinging the light on a surface comprises impinging the light on a frosted surface.

8. The method of claim 3, wherein impinging the light on a surface comprises impinging the light on a frosted surface, further wherein obtaining information from the illuminated region comprises obtaining a digitized image of the illuminated region through the frosted surface.

9. A machine-readable medium having instructions stored thereon capable of causing a processor to carry out the method of:
obtaining information from an illuminated region, wherein the illuminated region is generated by passing light from an illumination source through an aperture and impinging that light on a surface, further wherein obtaining information from the illuminated region comprises obtaining a digitized image of the illuminated region;
determining a quality of the illumination source derived from the information; and
generating an output for use in the computer application, wherein the output is indicative of the quality of the illumination source.

10. An input system, comprising:
an opaque plate having an aperture;
a video input device; and
a frosted plate interposed between the video input device and the opaque plate;
wherein light from an illumination source passing through the aperture impinges on the frosted plate, thereby producing an illuminated region on the frosted plate;
wherein the illuminated region on the frosted plate is indicative of at least one quality of the illumination source; and
wherein the illuminated region is visible to the video input device through the frosted plate.

11. An input system, comprising:
an opaque plate having an aperture;
a mirror;
a frosted plate interposed between the mirror and the opaque plate;
a video input device; and
a compensating lens interposed between the mirror and the video input device;
wherein light from an illumination source passing through the aperture impinges on the frosted plate, thereby producing an illuminated region on the frosted plate;
wherein the illuminated region on the frosted plate is indicative of at least one quality of the illumination source;
wherein the illuminated region is visible to the mirror through the frosted plate;
wherein the mirror redirects light from the illuminated region onto the compensating lens; and
wherein the compensating lens focuses the light from the illuminated region within a depth of field of the video input device.

12. The input system of claim 11, wherein a position of the illuminated region is indicative of an angle of incidence of the illumination source.

13. The input system of claim 11, wherein an intensity of the illuminated region is indicative of an intensity of the illumination source.

14. The input system of claim 11, wherein the at least one quality is selected from the group comprising location, angle of incidence, color and intensity.

15. The input system of claim 11, wherein the opaque plate and the frosted plate are generally planar and in a generally parallel space-apart relationship.

16. An input system, comprising:
a first opaque plate having a first aperture;
at least one video input device;
a first frosted plate interposed between the at least one video input device and the first opaque plate;
a second opaque plate having a second aperture; and
a second frosted plate interposed between the at least one video input device and the second opaque plate;
wherein light from an illumination source passing through the first aperture impinges on the first frosted plate, thereby producing a first illuminated region on the first frosted plate;
wherein light from an illumination source passing through the second aperture impinges on the second frosted plate, thereby producing a second illuminated region on the second frosted plate;
wherein the first and second illuminated regions are indicative of at least one quality of the illumination source;
wherein the first illuminated region is visible within a field of view of the at least one video input device; and
wherein the second illuminated region is visible within the field of view of the at least one video input device.

17. An input system, comprising:
a first opaque plate having a first aperture;
a first mirror;
a first frosted plate interposed between the first mirror and the first opaque plate;
a first video input device;
a first compensating lens interposed between the first mirror and the first video input device;
a second opaque plate having a second aperture;
a second mirror;
a second frosted plate interposed between the second mirror and the second opaque plate;
a second video input device; and
a second compensating lens interposed between the second mirror and the second video input device;
wherein light from an illumination source passing through the first aperture impinges on the first frosted plate, thereby producing a first illuminated region on the first frosted plate;
wherein light from the illumination source passing through the second aperture impinges on the second frosted plate, thereby producing a second illuminated region on the second frosted plate;
wherein the first and second illuminated regions are indicative of at least one quality of the illumination source;

wherein the first illuminated region is visible to the first mirror through the first frosted plate;

wherein the second illuminated region is visible to the second mirror through the second frosted plate;

wherein the first mirror redirects light from the first illuminated region onto the first compensating lens;

wherein the second mirror redirects light from the second illuminated region onto the second compensating lens;

wherein the first compensating lens focuses the light from the first illuminated region within a depth of field of the first video input device; and wherein the second compensating lens focuses the light from the second illuminated region within a depth of field of the second video input device.

18. The input system of claim 17, wherein the first opaque plate and the second opaque plate are the same plate.

19. The input system of claim 17, wherein the first frosted plate and the second frosted plate are the same plate.

20. The input system of claim 17, wherein each opaque plate is generally planar to its corresponding frosted plate.

21. The input system of claim 17, wherein the first video input device and the second video input device are a single video input device, further wherein the light from the first illuminated region is visible to a first portion of a field of view of the single video input device, still further wherein the light from the second illuminated region is visible to a second portion of the field of view of the single video input device.

22. A computer system, comprising:

a processor; and a machine-readable medium coupled to the processor, wherein the machine-readable medium has instructions stored thereon capable of causing the processor to carry out a method of:

obtaining information from an illuminated region, wherein the illuminated region is generated by passing light from an illumination source through an aperture and impinging that light on a surface;

determining a quality of the illumination source derived from the information; and generating an output for use in a computer application, wherein the output is indicative of the quality of the illumination source.

23. A computer system, comprising:

a processor; and a machine-readable medium coupled to the processor, wherein the machine-readable medium has instructions stored thereon capable of causing the processor to carry out a method of:

obtaining information from an illuminated region, wherein the illuminated region is generated by passing light from an illumination source through an aperture and impinging that light on a surface, further wherein obtaining information from the illuminated region comprises obtaining a digitized image of the illuminated region;

determining a quality of the illumination source derived from the information; and generating an output for use in the computer application, wherein the output is indicative of the quality of the illumination source.

24. The computer system of claim 23, wherein the information obtained is at least one datum selected from the group comprising size, shape, position, color and intensity.

25. The computer system of claim 23, wherein the quality is selected from the group comprising location, angle of incidence, color and intensity.

26. The computer system of claim 23, wherein the output is in a form selected from the group comprising textual, graphical and machine readable.

* * * * *